US012351438B2

(12) United States Patent
Moen et al.

(10) Patent No.: US 12,351,438 B2
(45) Date of Patent: Jul. 8, 2025

(54) PORTABLE ARTICLE LIFTER, SEPARATOR, AND COMPRESSOR

(71) Applicants: Andrew R. Moen, Livonia, MI (US); Sarah M. T. Miller, Ferndale, MI (US); Amanda Pfutzenreuter, Northville, MI (US); Colin Strate, Northville, MI (US); Kas Kasravi, West Bloomfield, MI (US)

(72) Inventors: Andrew R. Moen, Livonia, MI (US); Sarah M. T. Miller, Ferndale, MI (US); Amanda Pfutzenreuter, Northville, MI (US); Colin Strate, Northville, MI (US); Kas Kasravi, West Bloomfield, MI (US)

( * ) Notice: Subject to any disclaimer, the term of this patent is extended or adjusted under 35 U.S.C. 154(b) by 60 days.

(21) Appl. No.: 17/933,458

(22) Filed: Sep. 19, 2022

(65) Prior Publication Data

US 2024/0092617 A1 Mar. 21, 2024

(51) Int. Cl.
*B66F 3/44* (2006.01)
*B66F 5/02* (2006.01)

(52) U.S. Cl.
CPC . *B66F 3/44* (2013.01); *B66F 5/02* (2013.01)

(58) Field of Classification Search
CPC ..................................... B66F 3/44; B66F 5/02
See application file for complete search history.

(56) References Cited

U.S. PATENT DOCUMENTS

| | | | | |
|---|---|---|---|---|
| 3,451,655 A * | 6/1969 | Scott | B66F 3/44 | 254/7 R |
| 4,103,869 A * | 8/1978 | Mesny | B60S 9/06 | 254/425 |
| 4,872,230 A * | 10/1989 | Levine | B66F 3/44 | 254/DIG. 2 |
| 4,943,034 A * | 7/1990 | Wagnon | B66F 3/44 | 254/122 |
| 6,910,677 B1 * | 6/2005 | Miller | B66F 3/44 | 254/DIG. 1 |
| 2011/0001098 A1 * | 1/2011 | Lee | B66F 3/12 | 187/269 |
| 2023/0312314 A1 * | 10/2023 | Clayton | B66F 7/065 | |

* cited by examiner

*Primary Examiner* — Seahee Hong

(57) ABSTRACT

A portable article lifter, separator, and compressor capable moving a variety of articles. The core components are a frame, a motor, a power source, and a set of interchangeable end effectors suitable for moving different types of articles. This device is used to lift an article, separate multiple articles from each other, and compress one or more articles. Multiple devices can operate collaboratively to move a large and/or heavy article via daisy chaining the devices using synchronization modules. A transmission between the motor and the end effector controls the speed and the torque of the end effector. The device further provides an ON/Off module, a frame base, a handle, a level, wheels and rollers, and a work light.

9 Claims, 18 Drawing Sheets

PORTABLE ARTICLE LIFTER, SEPARATOR, AND COMPRESSOR

BACKGROUND OF THE INVENTION

The present invention relates generally to power tools, and specifically to a portable electromechanical tool for lifting, separating, and compressing articles.

Currently there are a number of solutions for moving large and/or heavy objects such as vehicles, boxes, furniture, and weights. Some of these solutions attempt to lift up articles via various jacks, but these solutions fail to meet the needs of the industry because they don't easily separate articles nor compress them in any direction. Other solutions attempt to use mechanical a ratchet mechanisms to separate articles, but these solutions are similarly unable to meet the needs of the industry because they can't easily move large and/or heavy articles and compress articles. Still other solutions, such as forklifts, seek to move heavy articles, but these solutions also fail to meet industry needs because they are heavy, expensive, and difficult to operate. No solution exists for coordinating multiple compressing and/or lifting devices together such that they could operate in concert on more complex tasks.

It would be desirable to have a portable device for moving articles by separating and/or compressing a variety of different articles, which would be inexpensive and easy to operate. Further, it would also be desirable to have a device with interchangeable end effectors so that different types of articles could be moved, such as furniture, boxes, weights, machines, and vehicles. Furthermore, it would be desirable to have a portable device that would work in concert with similar devices to move large and/or heavy objects. Still further, it would be desirable to have a portable device that rolls on the ground when moving articles. Therefore, there currently exists a need in the industry for a portable and low-cost device suitable for moving articles via separating and/or compressing that meets as described herein.

SUMMARY OF THE INVENTION

The present invention advantageously fills the aforementioned deficiencies by providing a portable article lifter, separator, and compressor, which is capable of moving a variety of articles using interchangeable end effectors for every application, and optionally connecting multiple such devices to allow them to collaboratively move large and/or heavy articles. The portable article lifter, separator, and compressor may hereafter be referred to as the present invention or the device.

The present invention is a portable article lifter, separator, and compressor, which is made up of the following components: a frame having a frame base, a motor having a drive shaft; a power source having an ON/Off module; a set of interchangeable end effectors each having at least two push surfaces. These components are related and connected to each other as follows: the frame having the general structure for mounting other components; the ON/Off module connects the power source to the motor in a switchable fashion; and, the motor's drive shaft connects to and operates the selected end effector. The end effectors are fabricated for specific use cases such as lifting weights, moving furniture, separating boxes, lifting and/or moving appliances, and the like.

The present invention may also have one or more of the following: the end effectors operating via hydraulic, inflatable, pneumatic, rachet, scissors, screw, telescopic and similar mechanisms; the power source having a rechargeable battery that is optionally interchangeable; the ON/Off module having a switch or a rheostat; the frame having a lifting handle; the frame having a light to illuminate the workspace; the frame base has legs, wheels, casters, or rollers; a level; a synchronization module with input and output ports to facilitate communication among multiple devices; a wire or wireless connector for connecting multiple synchronization modules on different devices; a transmission having input and output shafts located between the motor and the end effector to control the speed and the torque; and, a transmission control mechanism such as a transmission shifter.

The present invention is unique when compared with other known devices and solutions because the present invention provides: (1) the facility to lift, separate, and compress articles; (2) portability; (3) battery operated; (4) supports multiple end effectors for different applications; and, (5) multiple devices working in concert via interconnectivity.

The present invention is unique in that it is structurally different from other known devices or solutions. More specifically, the present invention is unique due to the presence of: (1) the facility to both separate and compress articles; (2) the ability to move a large variety of articles such as cars, appliances, furniture, weights in a gymnasium, and the like; (3) portability via interchangeable batteries; (4) move larger and more complex articles via collaboration among multiple embodiments of the present invention.

Among other things, it is an object of the present invention to provide a portable article lifter, separator, and compressor that does not suffer from any of the problems or deficiencies associated with prior solutions.

It is an objective of the present invention to both separate and compress one or more articles.

It is further an objective of the present invention to be portable.

It is still further an objective of the present invention to move complex articles via collaboration among multiple devices.

Further still, it is an objective of the present invention to be multi-purpose by moving a large variety of different types of articles.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
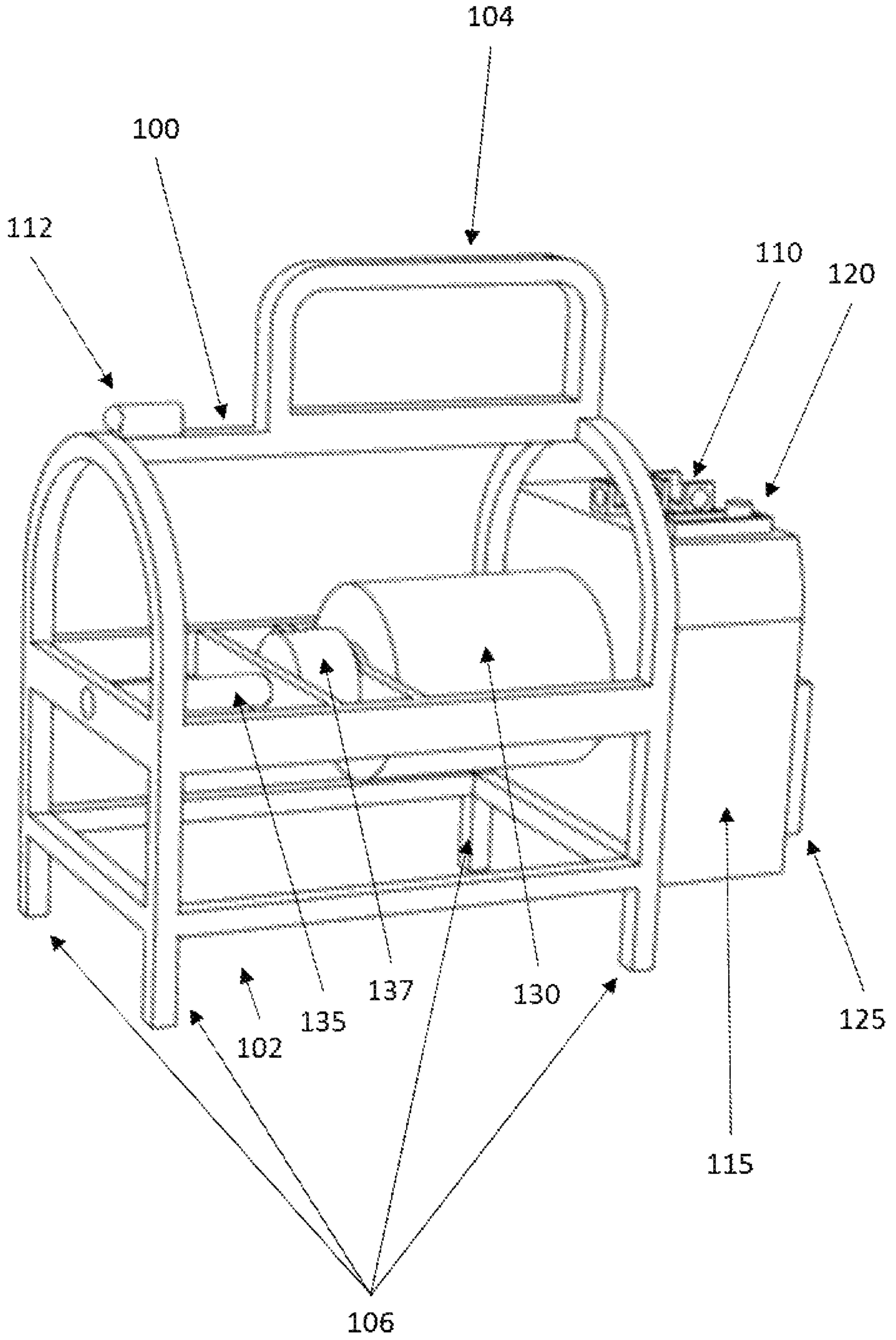
FIG. 1 shows a perspective view of a frame, a frame base, a motor, and a power supply.

The present invention is directed to power tools in general and a portable article lifter, separator, and compressor in particular.

The figures herein follow a numbering convention in which the first digit or digits correspond to the drawing figure number and the remaining digits identify an element or component in the drawing. Similar elements or components between different figures may be identified using similar digits. For example, 145 may reference element "45" in FIG. 1, and a similar element may be referenced as 245 in FIG. 2. Elements shown in the various figures herein can be added, exchanged, and/or eliminated to provide a number of additional examples of the present disclosure. In addition, the proportion and the relative scale of the elements provided in the figures are intended to illustrate the examples of the present disclosure and should not be taken in a limiting sense.

FIG. 1 illustrates a frame 100 having a frame base 102 and a lifting handle 104, and a plurality of legs 106 attached to the frame base 102. A motor 130 is securely attached to the frame 100, where the motor 130 has a drive shaft 135 and a motor coupler 137. The coupler 137 securely connects the drive shaft 135 to any component driven by the motor 130. A power source 115 is securely attached to the frame 100 and provides electrical power to the motor 130. The power source 115 has a rechargeable battery 125, and an ON/Off module 120, which turns on or shuts off the power source 125. Depending on the application, the ON/Off module may be a simple on/off switch, a rheostat for continuous control of the power supplied to the motor 130 by the power supply 115. A level 110 is securely attached to the power source 115 or optionally attached to any other stable component of the present invention such as the frame 100. The level 110 indicates the orientation of the entire device described herein along the horizontal axes. A light 112 is attached to the frame 100 to provide illumination to the work area. The light 112 receives electrical power from a source such as the power source 115.

Figure 2:
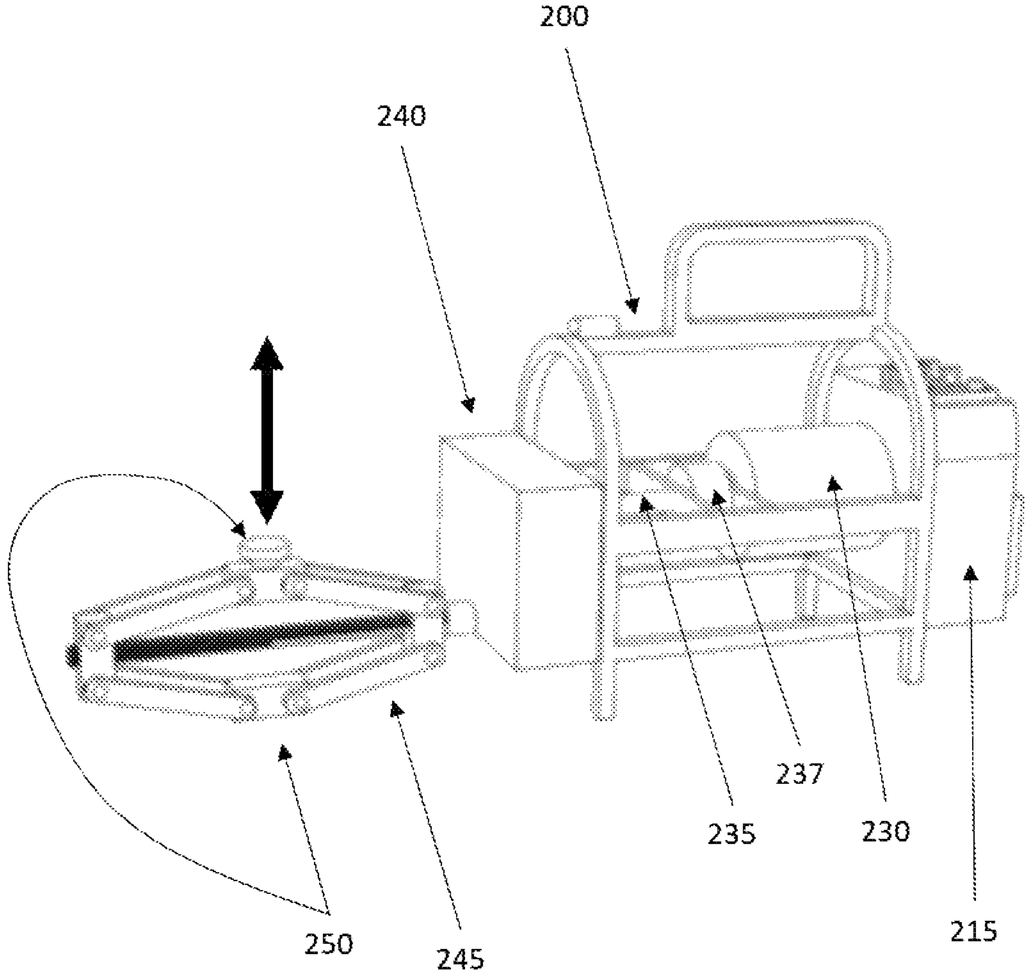
FIG. 2 shows a perspective view of the device with a scissor jack end effector.

FIG. 2 illustrates the most basic version of the present invention. An end effector 240 is attached to the frame 200 and driven by the motor 230 via the drive shaft 235 and the motor coupler 237, where the motor 230 receive power from power source 215. The end effector 240 uses a drive mechanism 245 to move two push surfaces 250 relative to each other as shown by the two-directional arrow. The action of the motor 230 and the end effector 240 result in the two push surfaces 250 to move closer or further from each other. Thus, the relative movement of the two push surfaces results in separating, compressing, or moving one or more objects, as desired by a user. The drive mechanism shown in FIG. 2 is a scissor jack. Other drive mechanisms such as, but not limited to, hydraulic, inflatable, pneumatic, rachet, bottle jack, trolley jack, screw, and telescopic mechanisms are optionally used to bring about the desired relative motion of the two push surfaces 250. In the preferred embodiment of the present invention different end effectors 240 are removeable and interchangeable. A person having ordinary skill in the art recognizes that the components of the present invention can be configured in different manners to accomplish the end result of moving the two push surfaces 250 relative to each other, thus separating, compressing, or moving one or more objects desired by the user.

Figure 3:
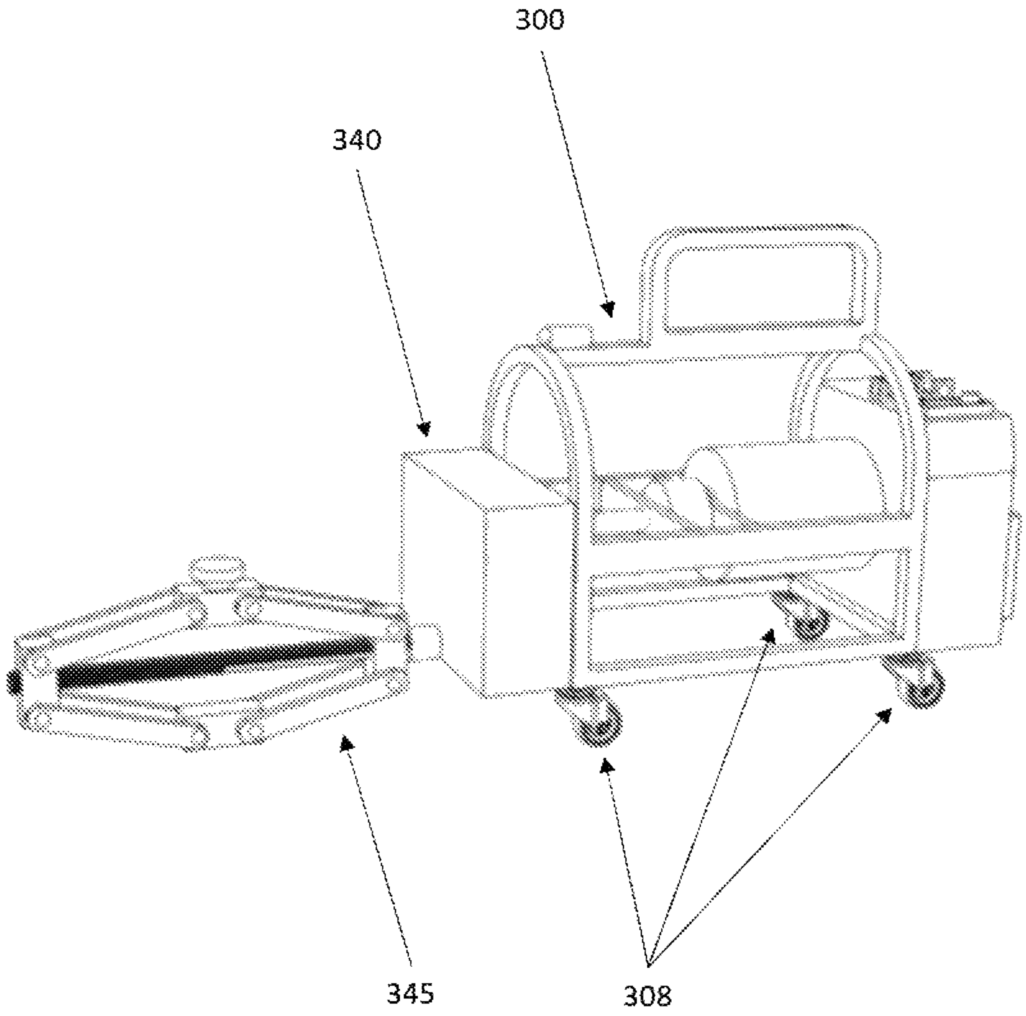
FIG. 3 shows a perspective view of the device with wheels.

FIG. 3 illustrates the frame 300, the end effector 340, the drive mechanism 345 and other aforementioned components. In addition, at least one support device 308 may be used instead of the legs 106 shown in FIG. 1. The support devices may be wheels, as shown in FIG. 3; alternatively, the support device may be a roller, a caster, or a similar component that would allow the present invention to easily roll on a floor. The utility of rolling devices is to allow the user to easily move the object being operated on by the present invention.

Figure 4:
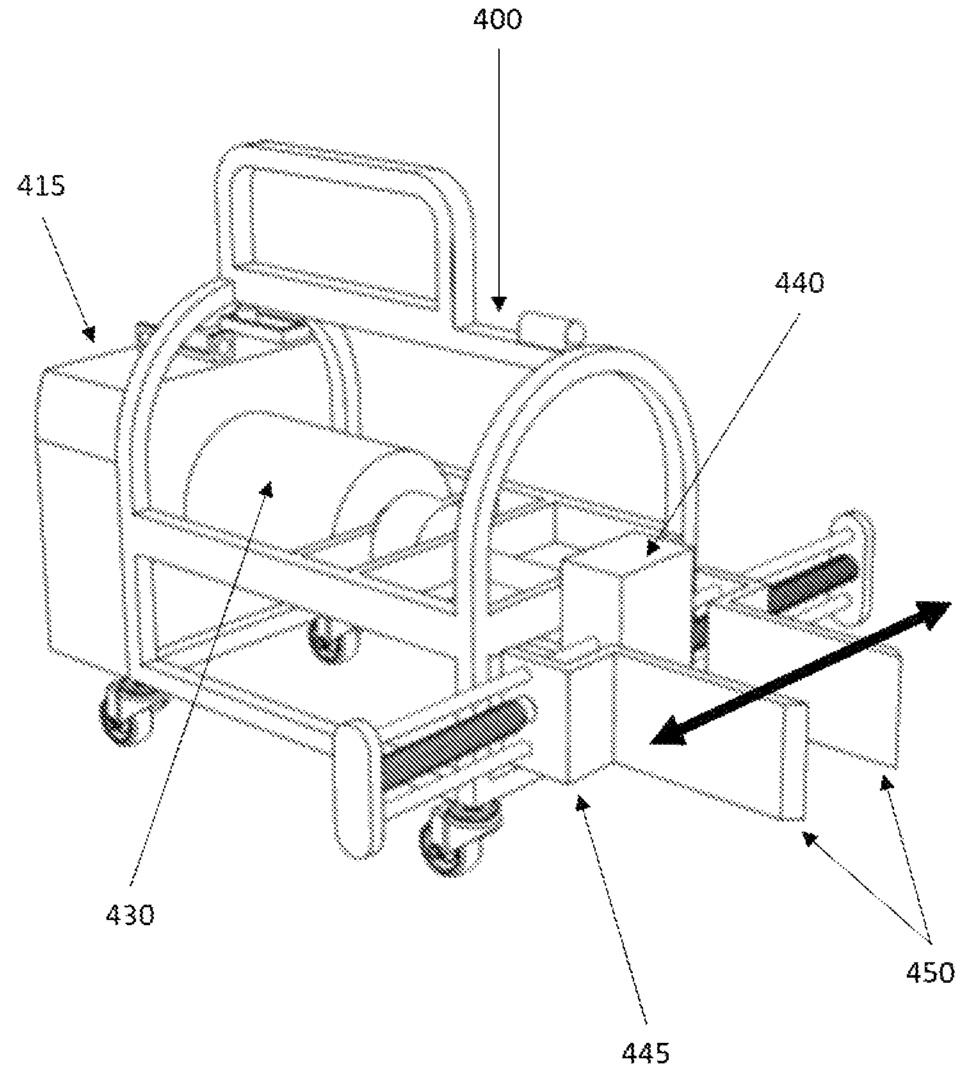
FIG. 4 shows a perspective view of the device with a screw separator/compressor end effector.

FIG. 4 illustrates the frame 400, the power source 415, the motor 430, the end effector 440, the drive mechanism 445, and two push surfaces 450. In this embodiment, the push surfaces are moved relative to each other in horizontal direction shown by the bi-directional arrow. The motor 430 is power by the power supply 415, which drives the end effector 440 causing the screw action of the drive mechanism 445 to move the push surfaces 450. In this embodiment the attachment between the end effector 440 and the frame 400 is optionally adjustable by the user, resulting in the push surfaces 450 moving relative to each other in non-horizontal directions.

Figure 5:
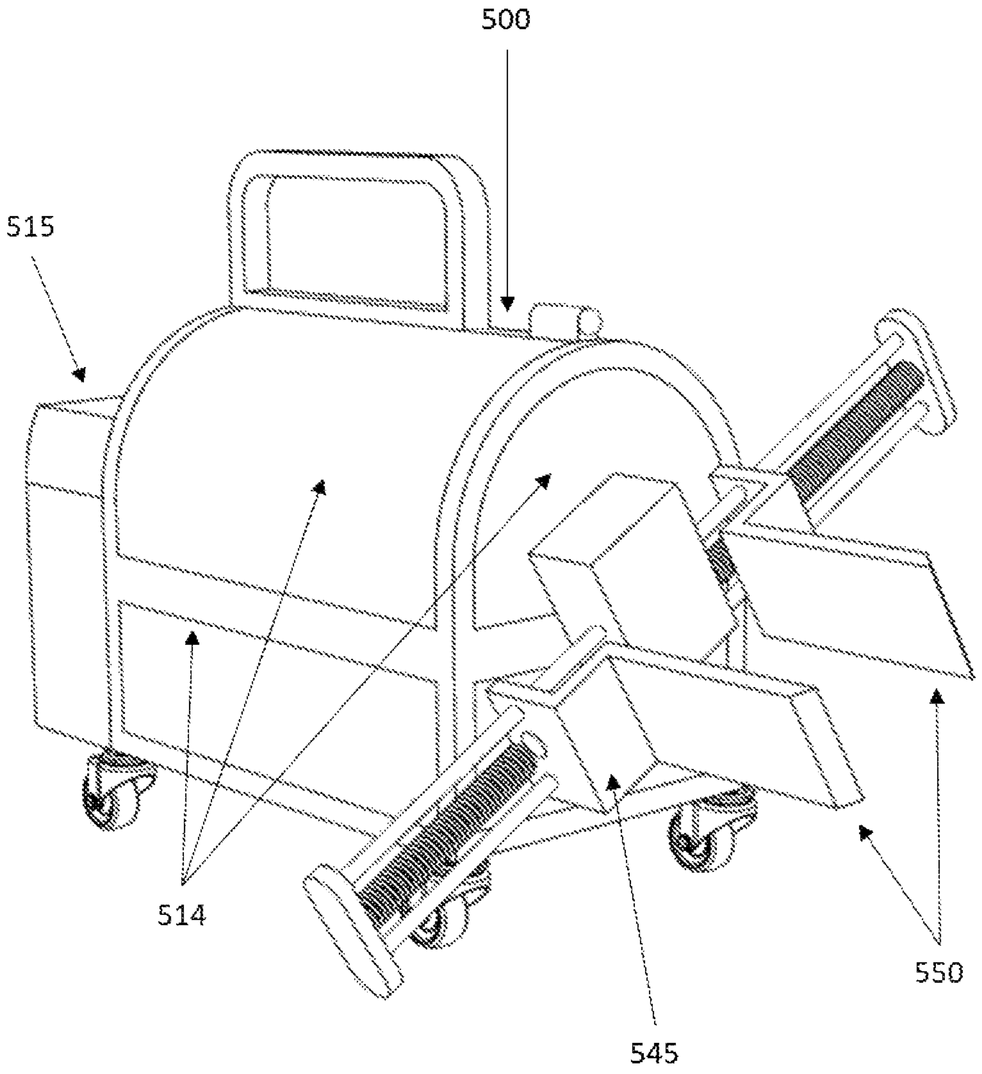
FIG. 5 shows a perspective view of the device with panels to form an enclosure.

FIG. 5 illustrates a complete embodiment of the present invention, showing the frame 500, the power source 515, the end effector 545, the push surfaces 550, and enclosure panels 514. The enclosure panels protect the internal components from external elements. The end effector 545 and the push surfaces 550 assembly are shown in a rotated position.

Figure 6:
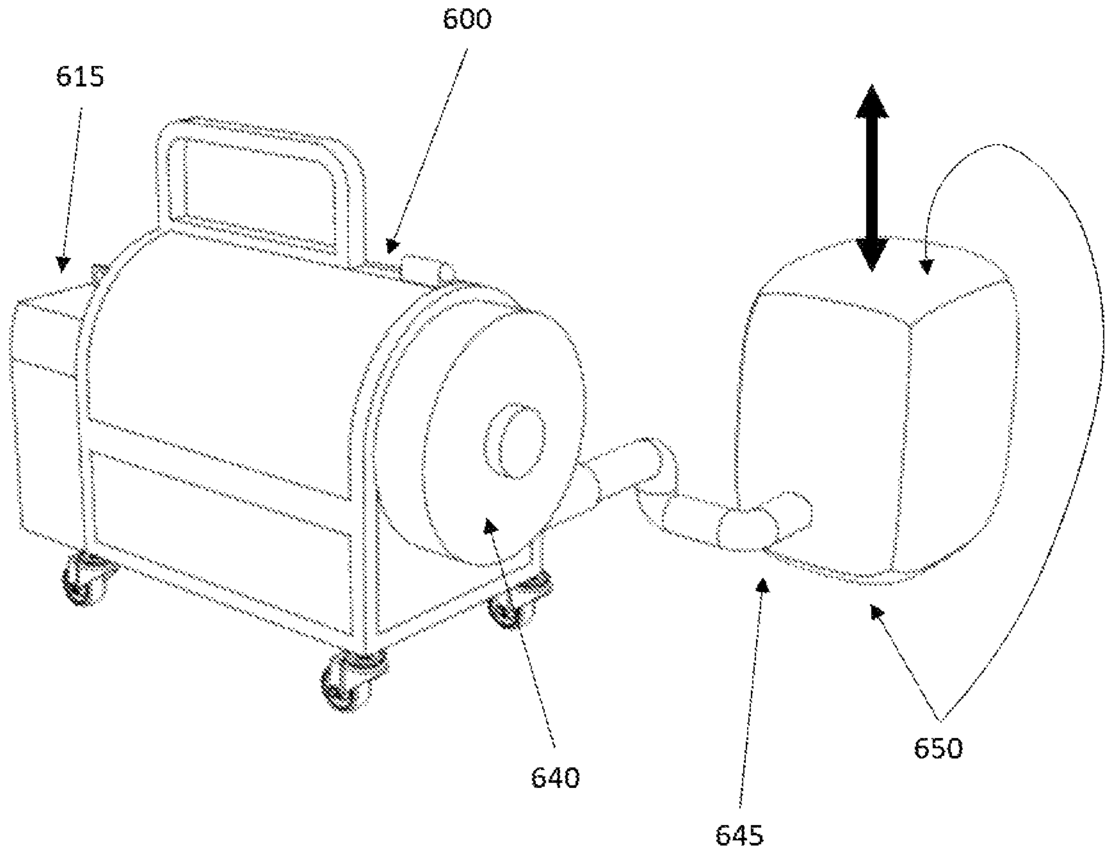
FIG. 6 shows a perspective view of the device with an inflatable end effector.

FIG. 6 illustrates yet another embodiment of the present invention, where the drive mechanism is an inflatable structure. Shown in the figure are the frame 600, the power source 615, the end effector 640, the drive mechanism 645, and the push surfaces 650. The end effector 640 is a pump and the drive mechanism 645 is an inflatable structure in this embodiment. The action of the end effector 640 inflates the drive mechanism 645 bringing about a relative movement between the push surfaces 650 located above and below the drive mechanism 640 in the direction of the bi-directional arrow. It is clear that the push surfaces 650 can operate in different angles and positions by reorienting and relocating the drive mechanism 645.

Figure 7:
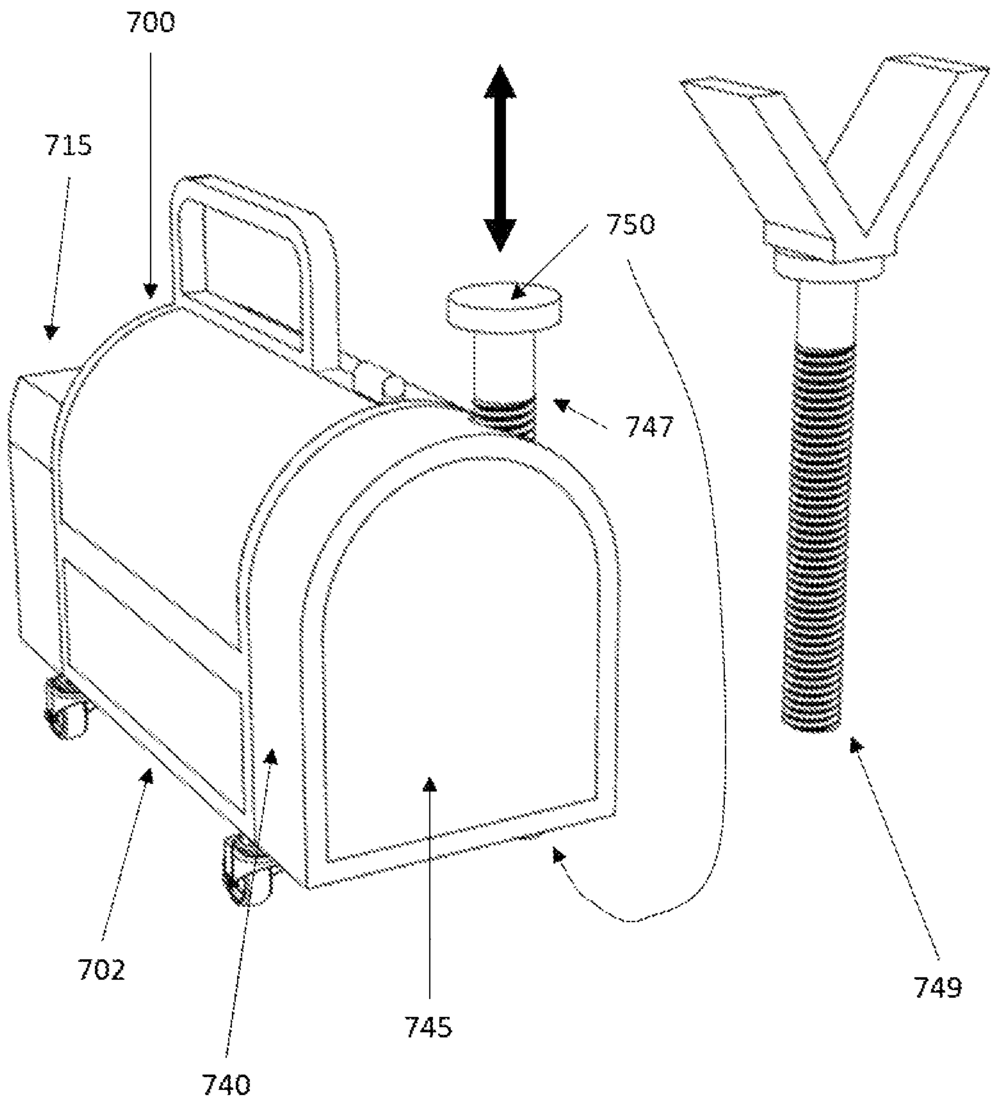
FIG. 7 shows a perspective view of the device with a bottle jack end effector and a second attachment.

FIG. 7 illustrates yet another embodiment of the present invention with a rod drive mechanism. This figure shows the frame 700, the frame base 702, the power source 715, the end effector 740, the drive mechanism 745, and the push surfaces 750. The end effector 740 and the drive mechanism 745 drive a rod 747 upwards, where the top of the rod is one push surface, and the frame base 702 with its associated support devices are the second push surface; thus, one push surface is pushed away from the floor. The push surfaces 750 are configured for different uses; for example, a second rod 749 can be used instead of the rod 747, where the second rod 749 is configured with a dove-tail end to lift a weight in a gymnasium. It is clear that various rod configurations can be fabricated for different use cases.

Figure 8:
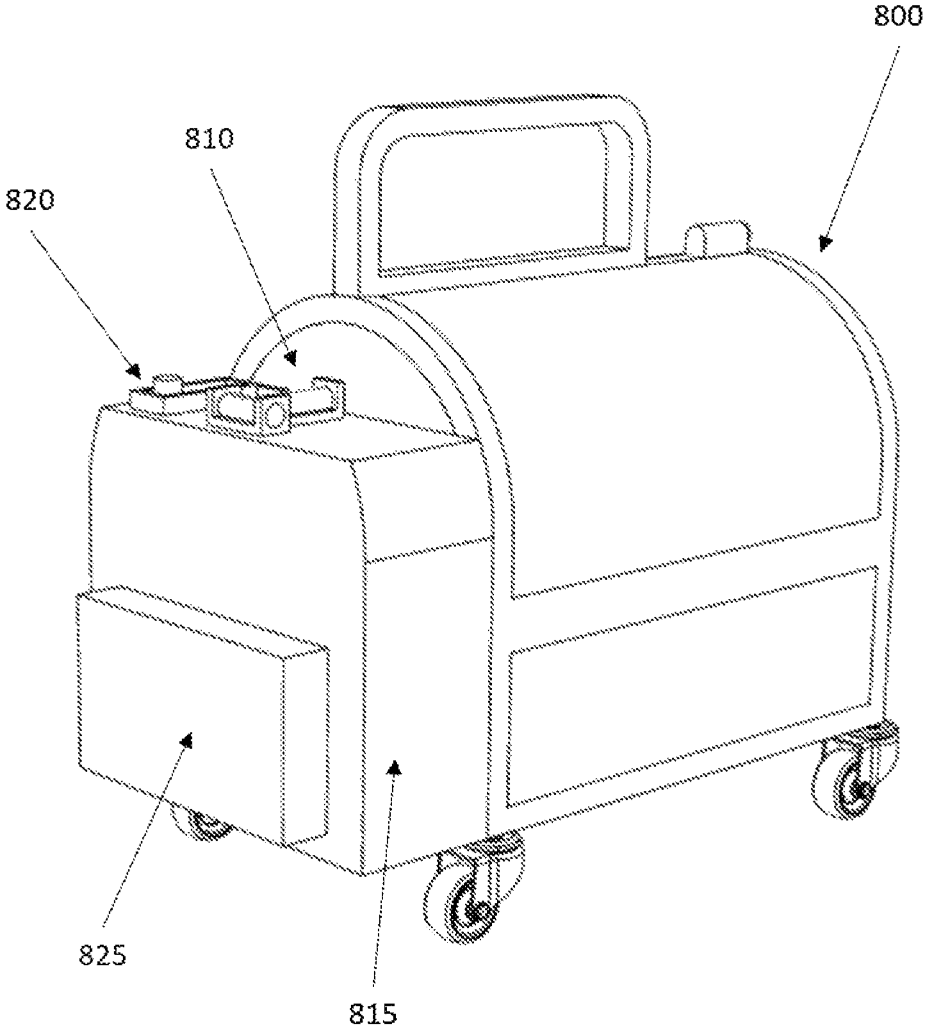
FIG. 8 shows a rear perspective view of the device highlighting a battery.
Figure 9:
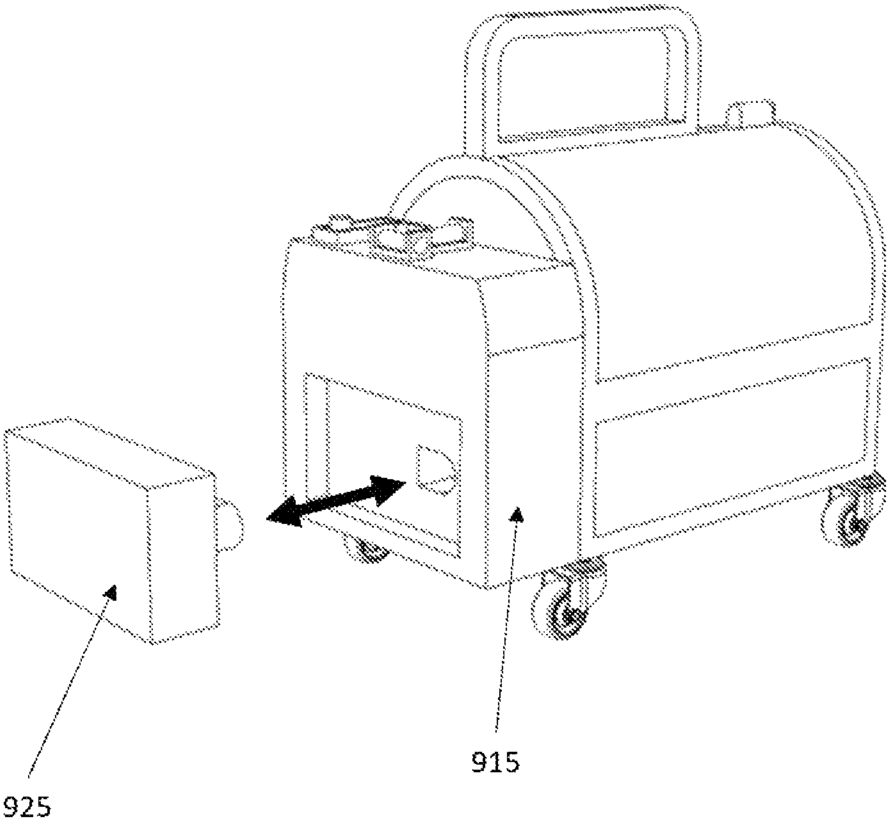
FIG. 9 shows a rear perspective view of the device highlighting an interchangeable battery.

FIG. 8 illustrates the rear of the present invention, showing the frame 800, the power source 815, the rechargeable battery 825, the ON/Off module 820, and the level 810. FIG. 9 illustrates the same components as in FIG. 8, but also shows the rechargeable battery 925 being removeable from the power source 915.

Figure 10:
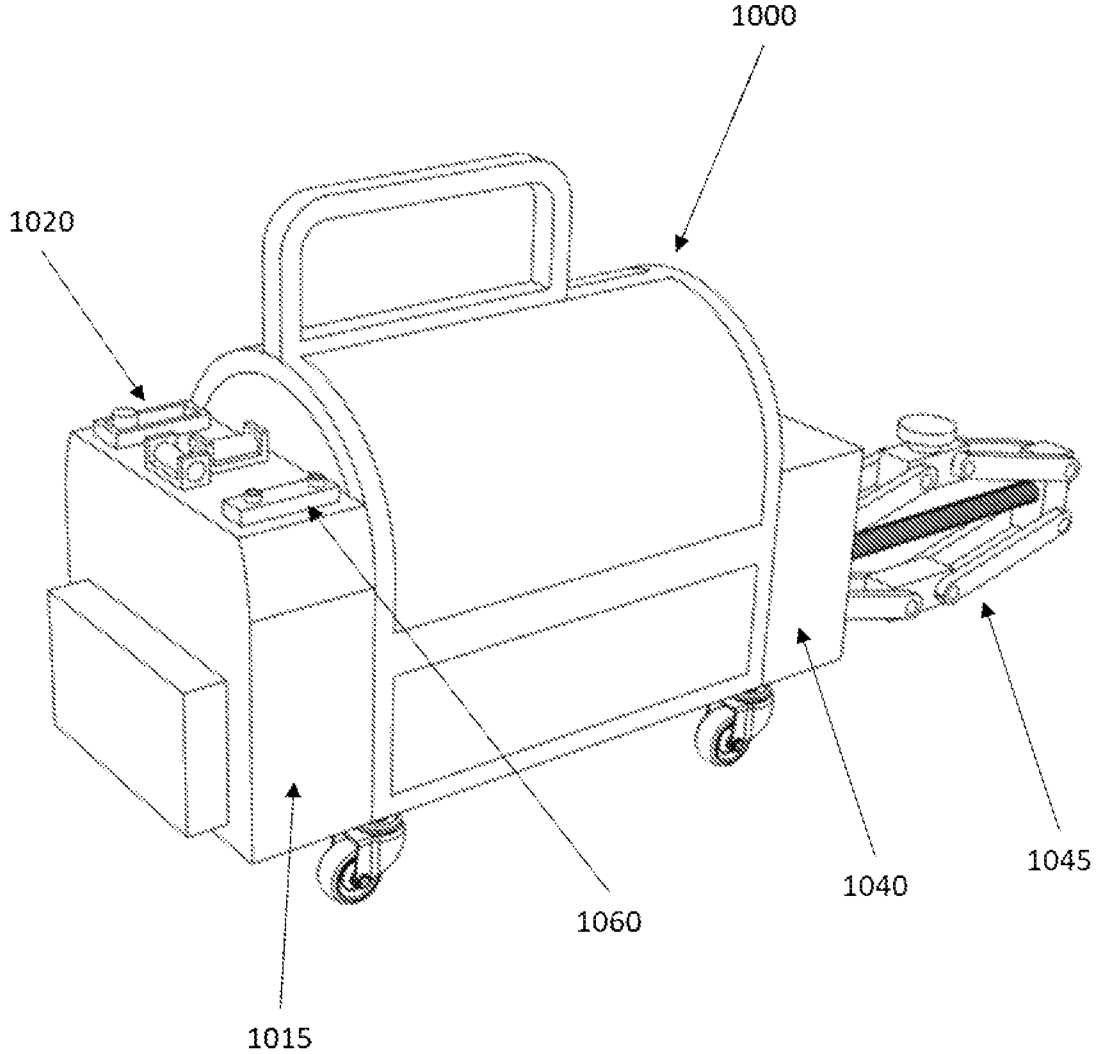
FIG. 10 shows a rear perspective view of the device with a synchronization module.

In the preferred embodiment of the present invention two or more portable article lifter, separator, and compressor devices are able to communicate and collaborate with each other, working on the same task involving separating, compressing, or moving objects. This utility is accomplished by daisy chaining the devices, where the first device signals its action to the next device in the chain; consequently, all devices in the chain simultaneously duplicate the action of the first device in the chain. A daisy chain is an interlinked series of devices. Such coordination is accomplished by connecting the devices together in a daisy chain manner either via wired or wireless connection, where the action of the first device in the chain is propagated to all devices in the same chain. FIG. 10 illustrates such embodiment of the present invention, where the frame 1000, the power source 1015, the end effector 1040, the drive mechanism 1045 and the ON/Off module 1020 are augmented with a synchronization module 1060. The synchronization module 1060 integrates with the ON/Off module 1020 and provides facility for connecting and daisy chaining multiple instances of the present invention together. Thus, multiple instances of the present invention are capable of operating collaboratively. The figures demonstrate wired connections, but a person having ordinary skill in the art recognizes that wireless components such as Bluetooth and Wi-Fi modules can be used to remotely and wirelessly connected multiple devices with the same utility described here.

Figure 11:
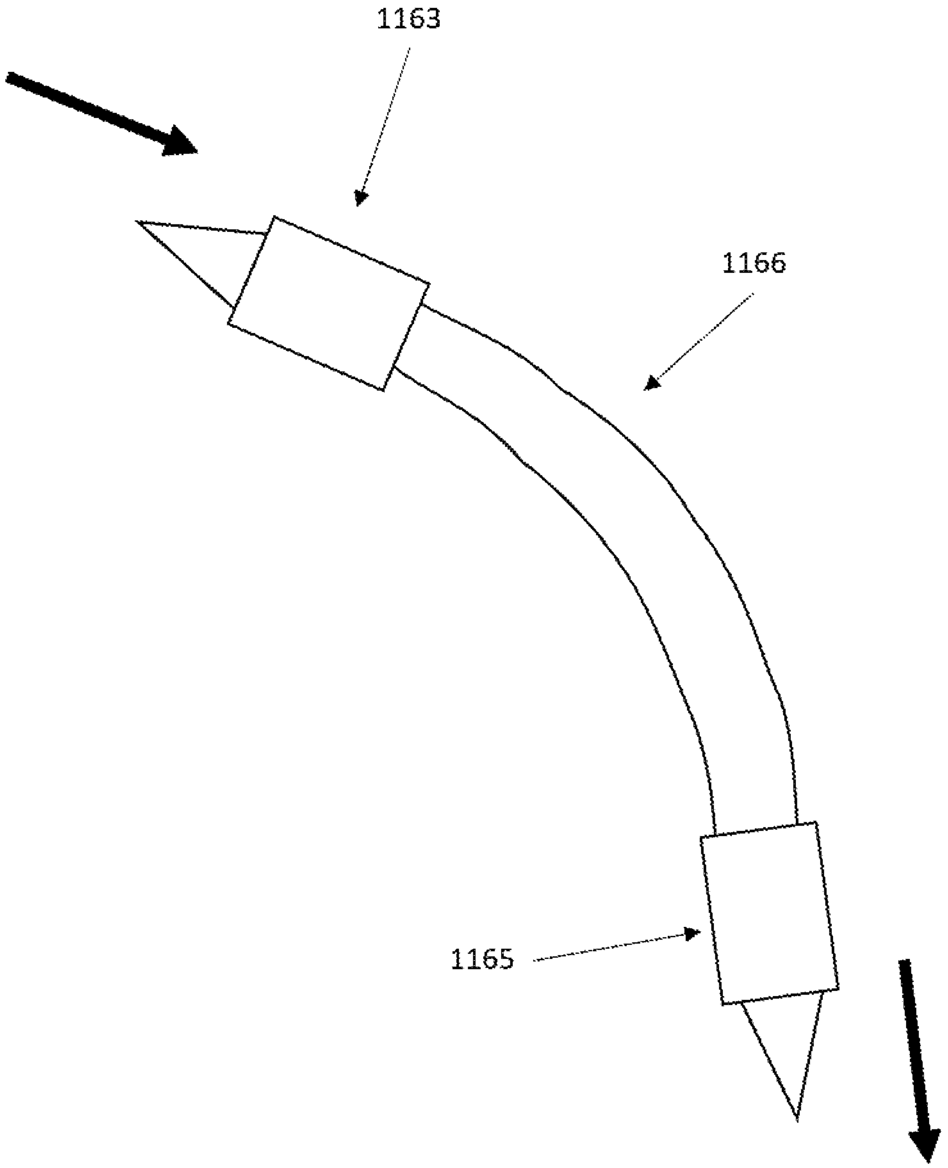
FIG. 11 shows a wire connector with input and output jacks.
Figure 12:
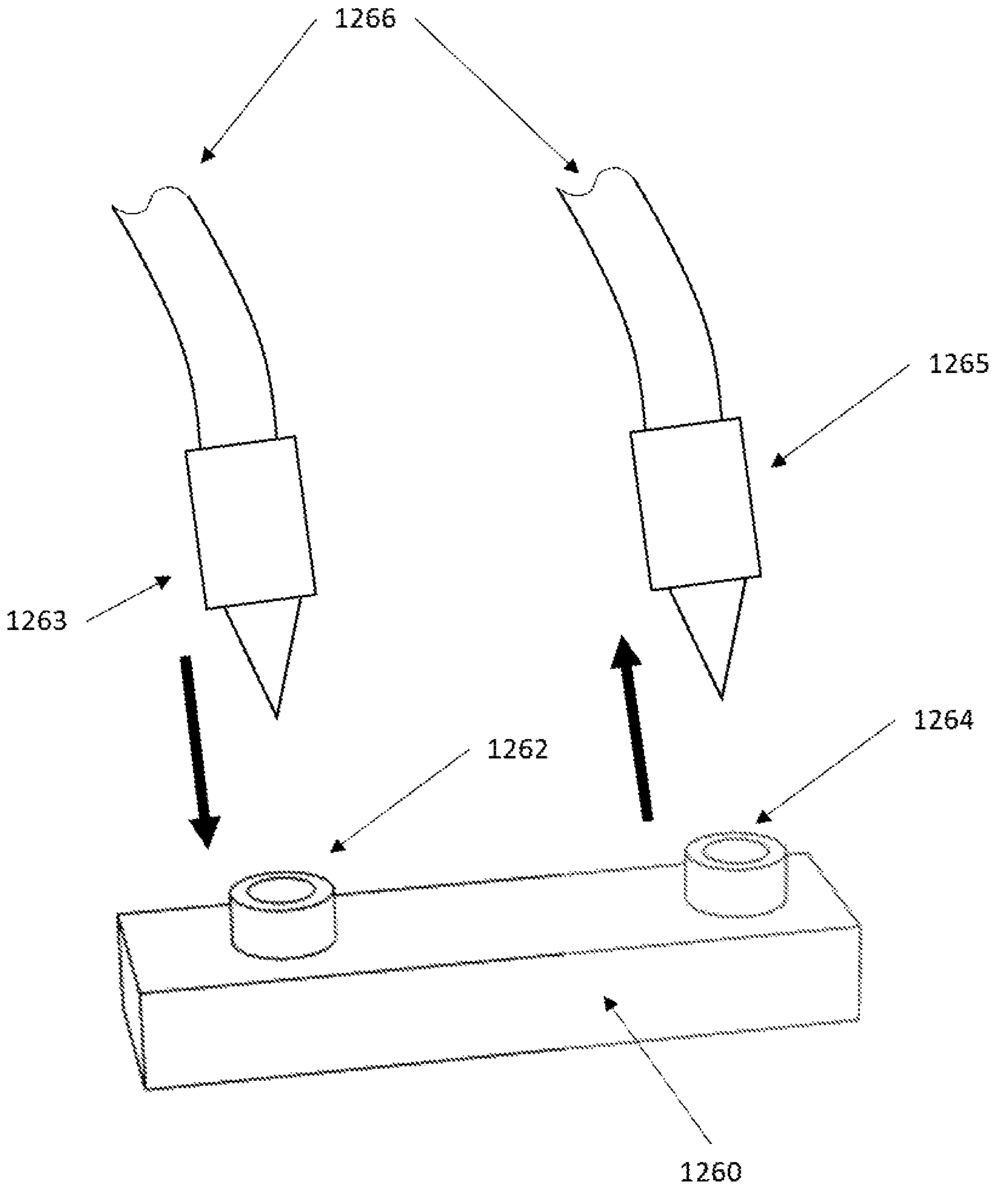
FIG. 12 shows a close-up perspective view of the synchronization module ports along with input and output jacks.
Figure 13:
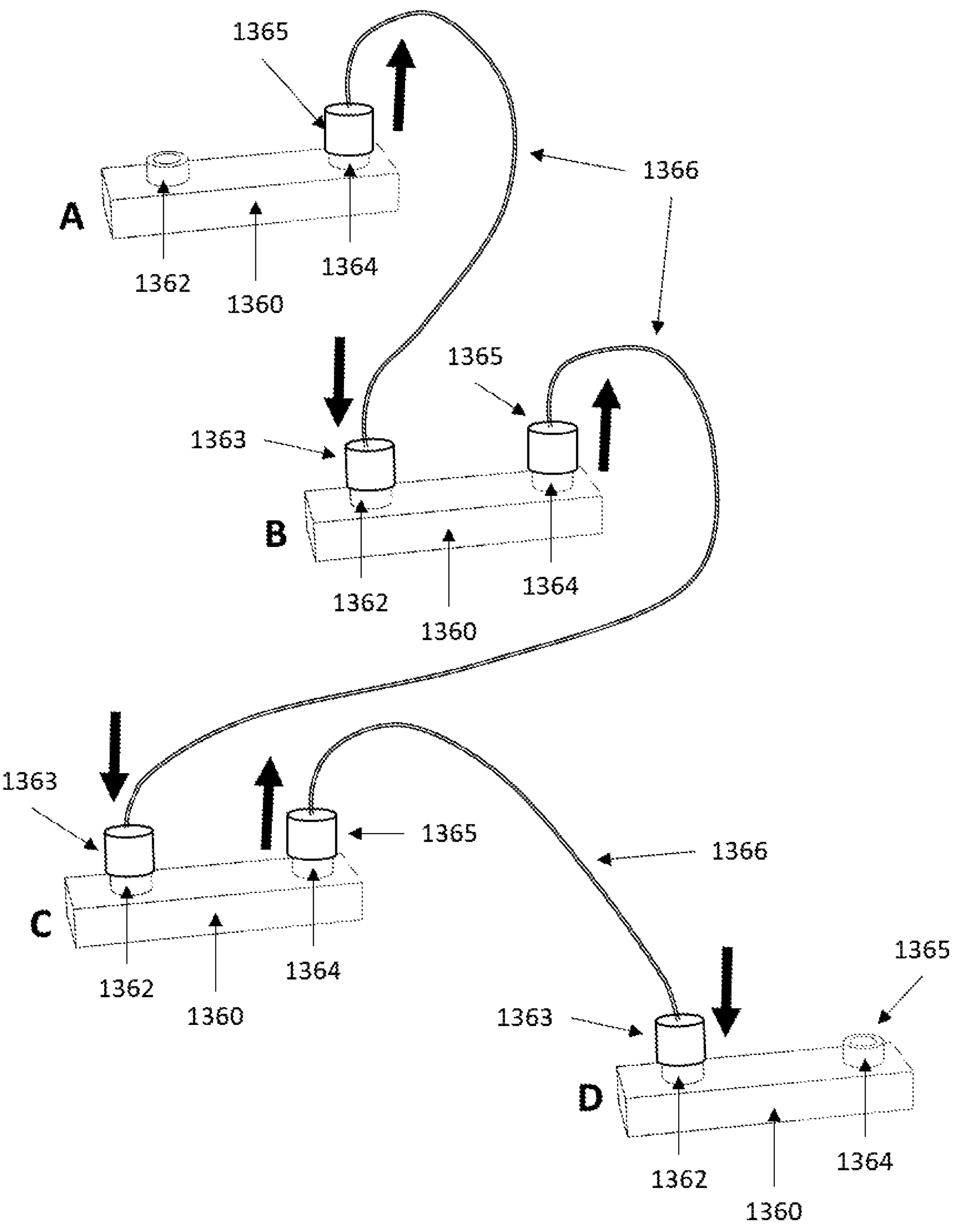
FIG. 13 shows several synchronization modules daisy changed with wire connectors.

FIG. 11 shows a wire connector 1166 having an output jack 1163 and an input jack 1165. The output jack 1163 and the input jack 1165 are physically identical, and the distinction merely implies the flow of signals from one end to another, as shown with the arrows in FIG. 11. FIG. 12 illustrates multiple devices daisy chained with wire connector 1266 via the synchronization modules 1260, where the output jack 1263 coming from the output port of another device is connected to the input port 1262 and the output port 1264 forwards the same signal via input jack 1265 to the input port of the next device. The aforementioned daisy chaining is illustrated in FIG. 13, where an exemplary four synchronization modules 1360 labeled A, B, C, and D are connected with the wire connectors 1366 together. In the arrangement shown in FIG. 13 the synchronization module 1360 A is the first unit in the chain. The status of the ON/Off module of this first unit is transmitted via the output port 1364 of unit A into the input jack 1363 and passed along the wire connector 1366 to its output jack 1365 connected to the input port 1362 of the synchronization module 1360 of unit B as shown with the arrows. The same process continues for the downstream devices C and D as shown in FIG. 13. Such a daisy chain can consist of two or more devices.

Figure 14:
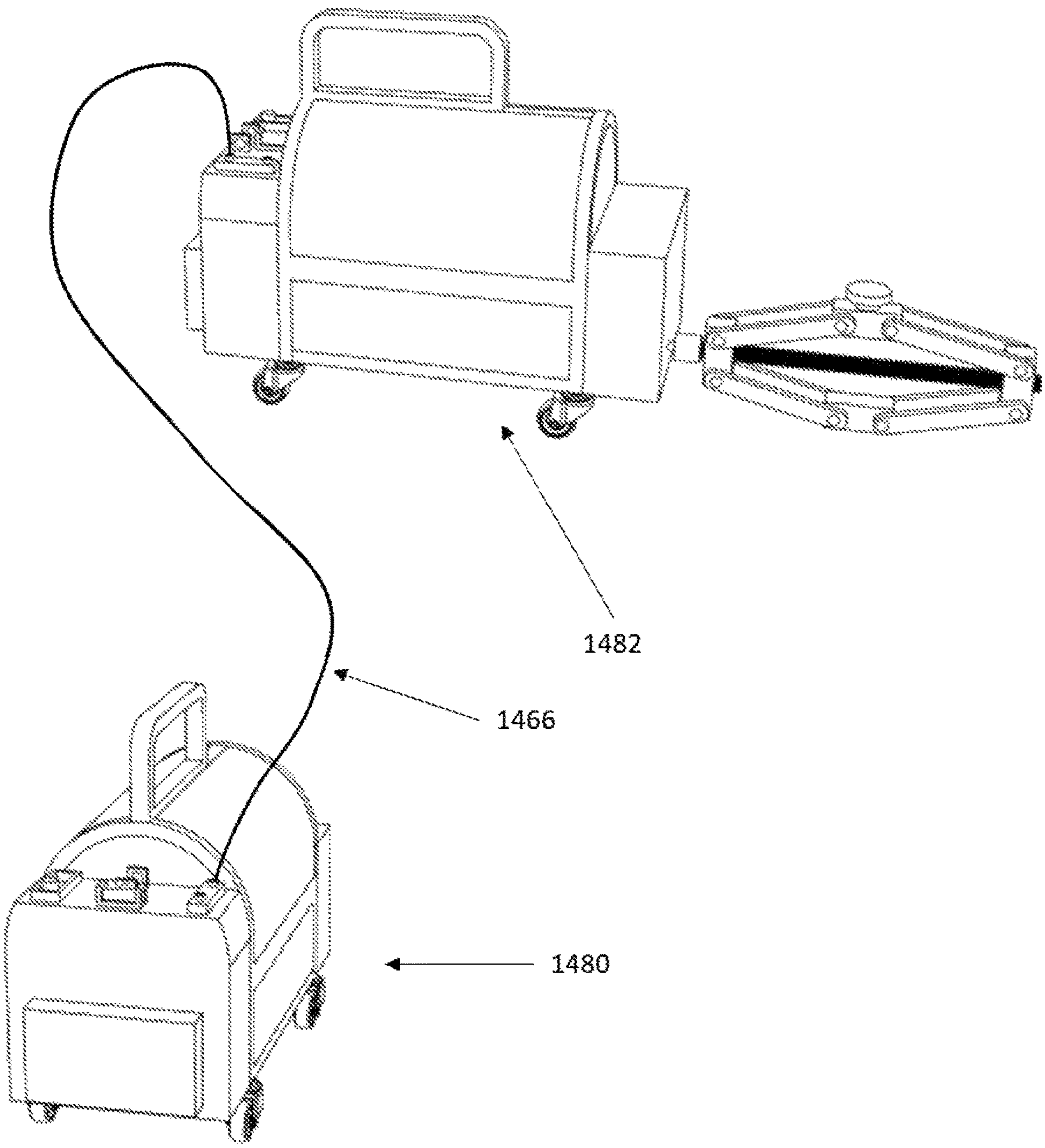
FIG. 14 shows a perspective view of two devices connected with a wire.

FIG. 14 illustrates daisy chaining between a first portable article lifter, separator, and compressor 1480 and a second portable article lifter, separator, and compressor 1482. The setting of the ON/Off module of the first portable article lifter, separator, and compressor 1480 is transmitted via its output port and wire connector 1466 to the input port of the second portable article lifter, separator, and compressor 1482. This arrangement is repeatable for additional portable article lifter, separator, and compressor devices.

When daisy chained, the ON/Off module setting of the first device is propagated to all the connected devices. The ON/Off modules of the downstream devices are overridden by the signals received through the input ports of the synchronization modules of the respective devices. The downstream devices operate normally when removed from the daisy chain.

Figure 15:
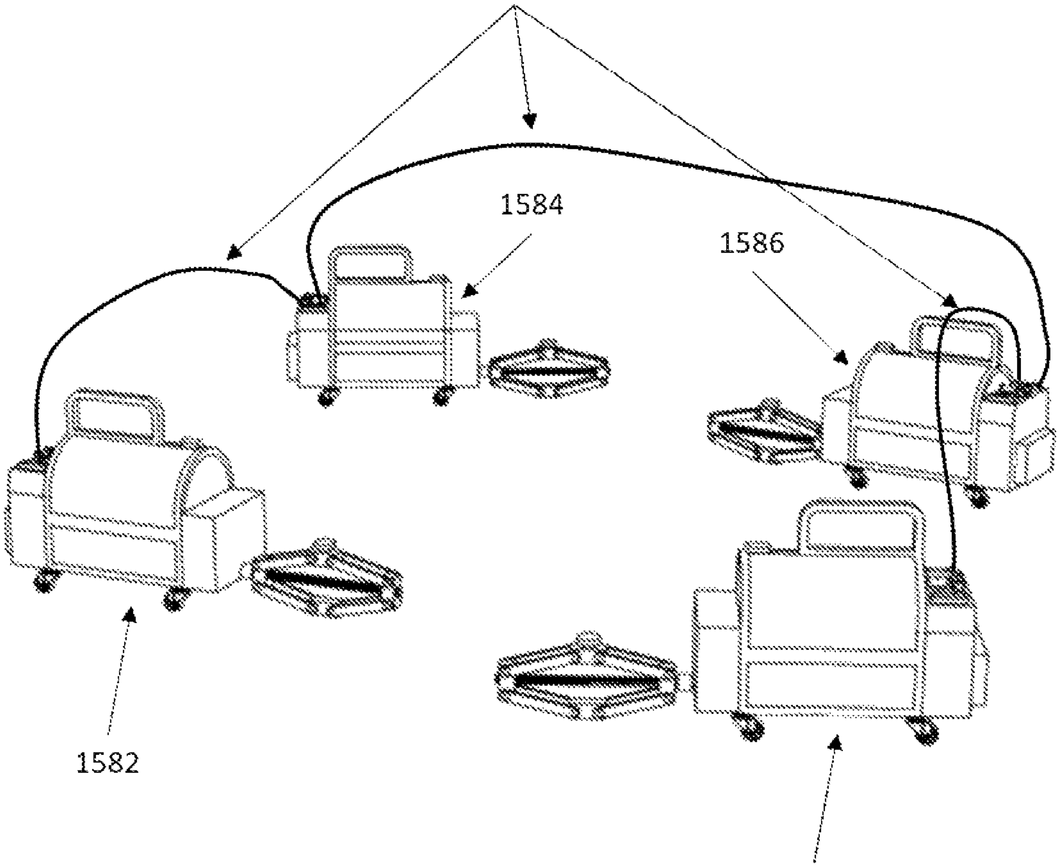
FIG. 15 shows a perspective view of multiple devices daisy chained with wire connectors.

FIG. 15 illustrates a daisy chain with exemplary four portable article lifter, separator, and compressor devices labeled 1582, 1584, 1586, and 1588, which are chained together with wire connectors 1566. The first portable article lifter, separator, and compressor 1582 is the primary device in this chain where its ON/Off module is propagated to the downstream devices. Thus, if the ON/OFF module of the first portable article lifter, separator, and compressor 1582 is set to ON, then the remaining devices in the chain are all set to ON as well, and vice versa, leading to all devices in the chain switch ON and OFF simultaneously.

Figure 16:
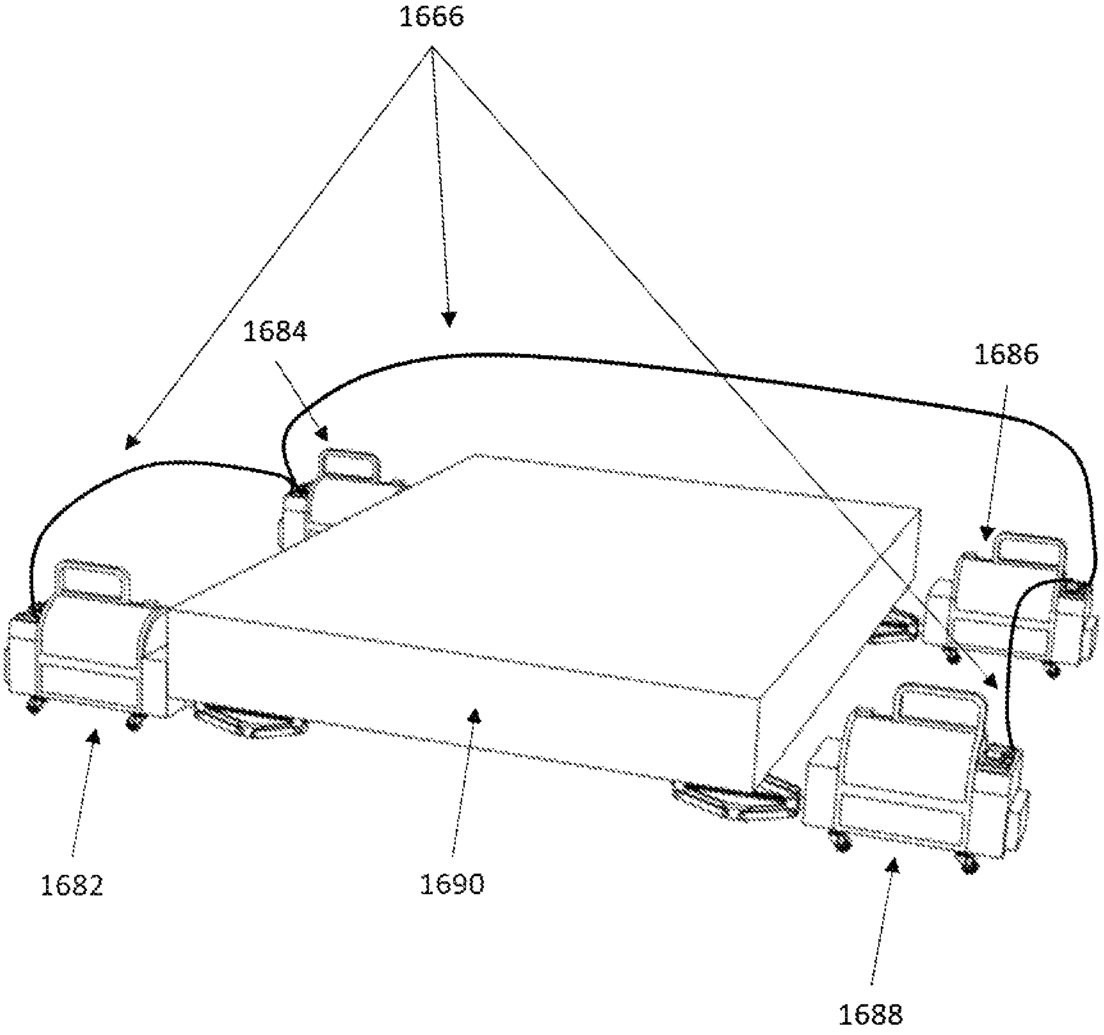
FIG. 16 shows a perspective view of multiple devices collaboratively moving an article.

FIG. 16 illustrates collaborative operation among an exemplary four devices, where the portable article lifter, separator, and compressor devices labeled 1682, 1684, 1686 and 1688, which are chained together with wire connectors 1666, all working together in response to the ON/OFF module setting of the first portable article lifter, separator, and compressor 1682. The result of such collaboration, in the illustrated case, is lifting a heavy object 1690 in a coordinated fashion, where each device alone would not have been able to lift the heavy object 1690 individually as intended by the user.

Figure 17:
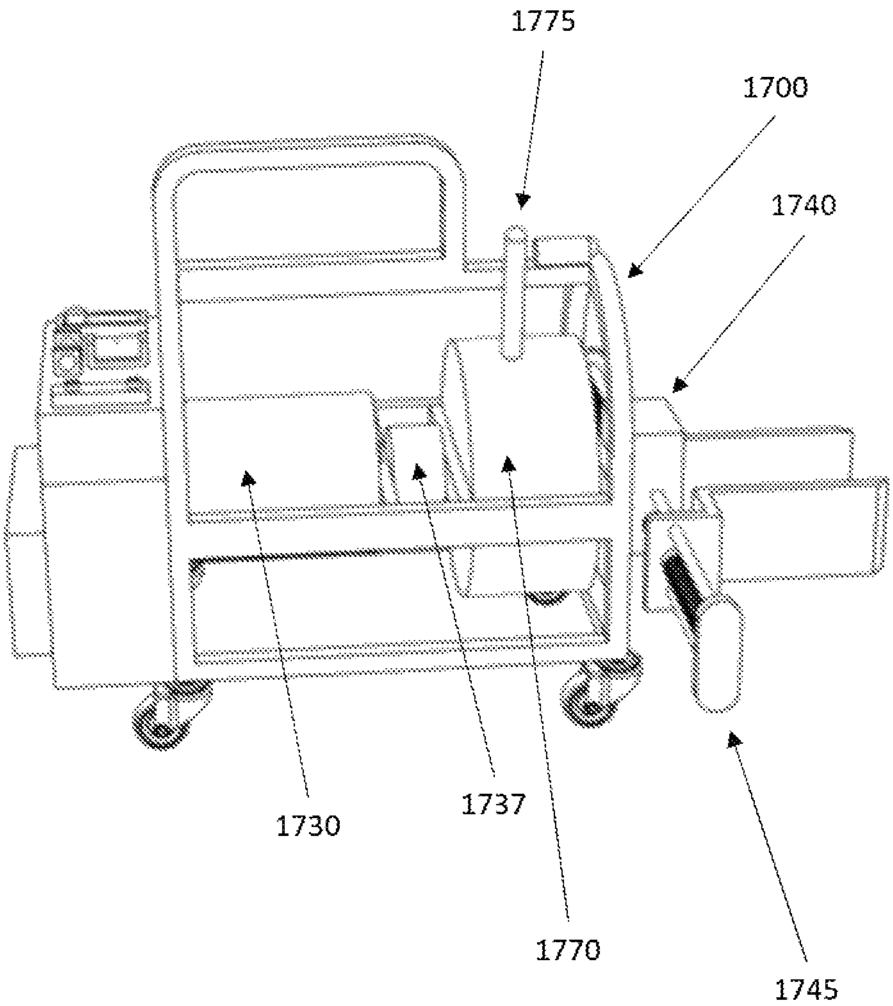
FIG. 17 shows a perspective view of a transmission located within the device.

The preferred embodiment of the present invention provides the ability to control the speed and torque of the end effector. Thus, a transmission is used between the motor and the end effector allowing the user to adjust the speed and power of the end effector and the drive mechanism as needed for any specific use case. FIG. 17 illustrates a transmission 1770 having a transmission shifter 1775 securely fitted with the frame 1700. The transmission 1770 is connected to the motor 1730 via the coupler 1737 to the end effector 1740. The user controls the transmission via the transmission shifter 1775, thus controlling the operations of the drive mechanism 1745 via the end effector 1740.

Figure 18:
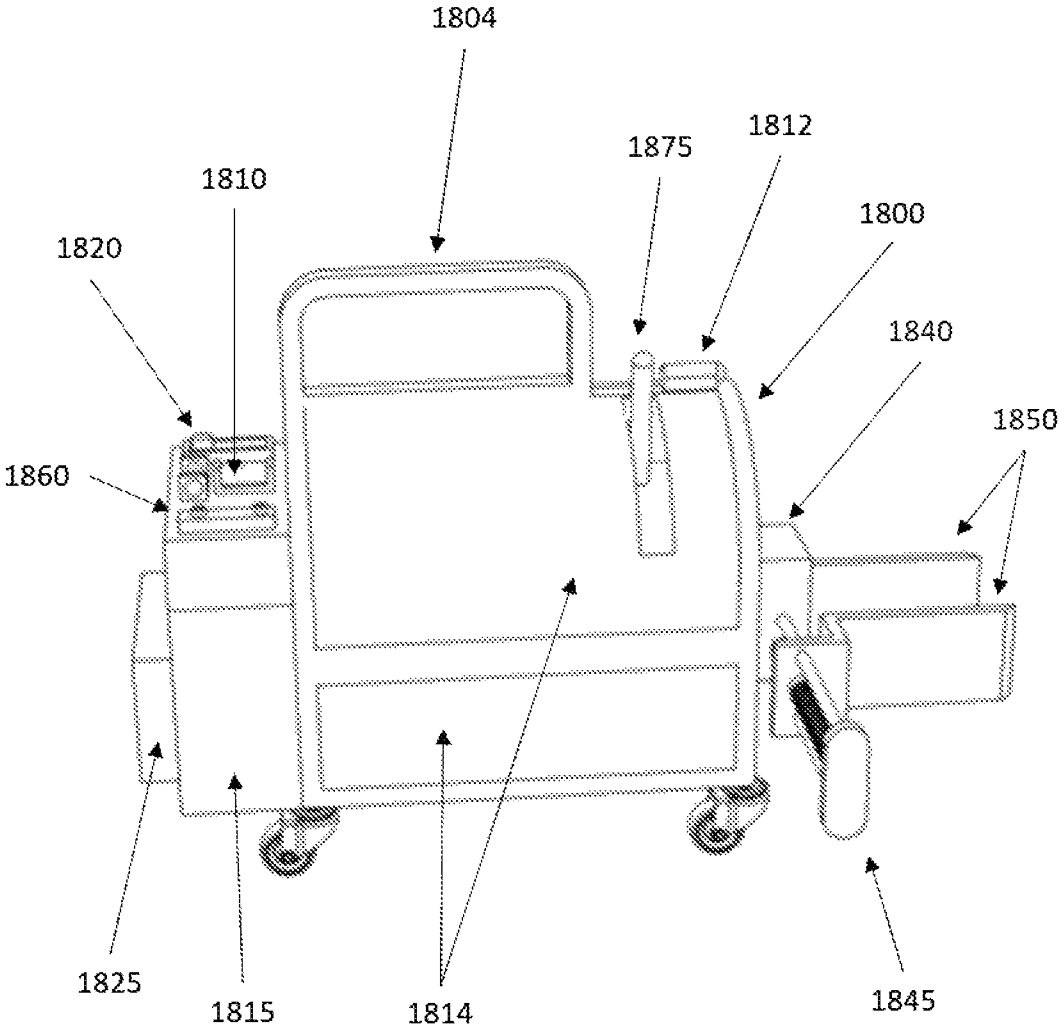
FIG. 18 shows a perspective view of the device enclosed with panels and showing a transmission shifter.

FIG. 18 illustrates the complete preferred embodiment of the present invention having the frame 1800, the frame handle 1804, the enclosure panels 1814, the power source 1815, the battery 1825, the ON/OFF module 1820, the synchronization module 1860, the level 1810, the light 1812, the end effector 1840, a drive mechanism 1845, the push surfaces 1850, and the transmission shifter 1875. A person having ordinary skill in the art recognizes that the components of the present invention are configurable for different applications and a variety of drive mechanism and push surfaces can be implemented.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. A portable article lifter, separator, and compressor comprising:

a frame having a frame base;

a motor securely attached to the frame, wherein the motor has a drive shaft;

a power source securely attached to the frame;

an ON/OFF module securely attached to the frame, wherein the ON/Off module electrically connects the power source to the motor;

the frame has an integrated lifting handle;

wherein the frame base has at least one support device comprising at least one of a leg, a roller, and a caster, and a wheel;

an end effector attached to the drive shaft and the frame, wherein the end effector is coupled with the drive shaft;

the end effector comprises at least two push surfaces and a drive mechanism, wherein the drive mechanism moves the push surfaces relative to each other providing separation or compression effects; and the drive mechanism operates using at least one of a hydraulic, an inflatable, a pneumatic, a ratchet, a bottle, a trolley, and a telescopic mechanism fashioned to lift, separate, and compress artifacts.

2. The portable article lifter, separator, and compressor of claim 1, wherein the end effector and the drive mechanism are interchangeable relative to the drive shaft.

3. The portable article lifter, separator, and compressor of claim 2, wherein the power source is a rechargeable battery.

4. The portable article lifter, separator, and compressor of claim 3, wherein the ON/OFF module is a switch or a rheostat providing control over the flow of electricity to the motor.

5. The portable article lifter, separator, and compressor of claim 1, wherein the frame has a light powered by the power source.

6. A portable article lifter, separator, and compressor comprising:

a frame having a frame base;

a motor securely attached to the frame, wherein the motor has a drive shaft;

a power source securely attached to the frame;

an ON/OFF module securely attached to the frame, wherein the ON/Off module electrically connects the power source to the motor;

the ON/OFF module is a switch or a rheostat providing control over the flow of electricity to the motor;

the frame has a lifting handle;

the frame base has at least one support device comprising at least one of a leg, a roller, a caster, and a wheel;

an end effector attached to the drive shaft and the frame, wherein the end effector is coupled with the drive shaft;

the end effector comprises at least two push surfaces and a drive mechanism, where the drive mechanism operates using at least one of a hydraulic, an inflatable, a pneumatic, a rachet, a scissor, a bottle, a trolley, a screw, and a telescopic mechanism fashioned to lift, separate, and compress artifacts;

the end effector and the drive mechanism are removeable and interchangeable;

the drive mechanism moves the push surfaces relative to each other providing separation or compression effects;

a synchronization module integrated with the ON/OFF module, wherein the synchronization module has an input port and an output port; and the output port of one synchronization module is connected to the input port of the synchronization module of another instance of the portable article lifter, separator, and compressor providing synchronous operations among the connected portable article lifter, separator, and compressor.

7. The portable article lifter, separator, and compressor of claim 6, wherein the synchronization modules between pairs of portable article lifter, separator, and compressors are connected via a wired connection using a wire connector or a wireless connection using a wireless connector in a daisy chained manner to operate a plurality of portable article lifter, separator, and compressor.

8. The portable article lifter, separator, and compressor of claim 7, wherein the power source is a rechargeable battery.

9. The portable article lifter, separator, and compressor of claim 6, wherein the frame base has a level.

* * * * *